United States Patent [19]
Yamamoto et al.

[11] Patent Number: 4,592,623
[45] Date of Patent: Jun. 3, 1986

[54] POLARIZING PLATE

[75] Inventors: Suguru Yamamoto; Kazuaki Sasa; Toshihiko Sugimoto, all of Osaka, Japan

[73] Assignee: Nitto Electric Industrial Co., Ltd., Osaka, Japan

[21] Appl. No.: 534,868

[22] Filed: Sep. 22, 1983

[30] Foreign Application Priority Data

Sep. 22, 1982 [JP] Japan .................. 57-165700

[51] Int. Cl.⁴ .............................................. G02B 5/30
[52] U.S. Cl. ................................... 350/397; 427/163; 350/337
[58] Field of Search ............... 350/337, 400, 404, 405, 350/406, 397, 370; 427/163

[56] References Cited

U.S. PATENT DOCUMENTS 3,647,278  3/1972  Nakas ................................. 350/405
4,268,127  5/1981  Oshima et al. .................... 350/337
4,387,133  6/1983  Ichikawa et al. ................. 350/337
4,427,741  1/1984  Aizawa et al. .................... 427/163

Primary Examiner—John K. Corbin
Assistant Examiner—B. S. Shapiro
Attorney, Agent, or Firm—Sughrue, Mion, Zinn, Macpeak and Seas

[57] ABSTRACT

A polarizing plate is disclosed, comprising a polarizing film and a protective layer bonded through an adhesive layer to at least one surface of the polarizing film, wherein the protective layer is a polyester film in which the minimum or maximum refractive index in a direction in parallel with the plane of the film is nearly equal to that in the direction of the film thickness and the retardation is at least 10 μm. On this polarizing plate, colored interference fringes are not formed at all even if it is looked at from any direction. Thus, the polarizing plate is suitable for use in the circumstance that it is exposed to the air, or in a display wherein a liquid crystal is used.

15 Claims, 6 Drawing Figures

POLARIZING PLATE

FIELD OF THE INVENTION

The present invention relates to a polarizing plate and, more particularly, to a polarizing plate protected by a transparent protective layer which prevents the formation of colored interference fringes by reflected light or transmitted light.

BACKGROUND OF THE INVENTION

When a polarizing film is used under such conditions that it will be exposed to the air, or will be in a display in which a liquid crystal is used, it is necessary to provide a protective layer on the surface of the polarizing film in order to protect it from scratches, moisture or corrosion due to chemicals. Glass and plastic materials have been used in the preparation of such protective layers. These materials, however, suffer from various disadvantages. In the case of a glass protective layer, the glass layer is fairly thick for adequate strength and is heavy in weight. Plastic materials now in practical use are cellulose-based and acryl-based resins. Protective layers made of such materials are inferior in shape, dimensional stability, moisture resistance, and heat resistance, and are particularly unsuitable for outdoor uses.

An attempt has been made to use a film of polyethylene terephthalate (hereinafter sometimes referred to as "PET"), a kind of polyester, which has been longitudinally, transversely or biaxially stretched at a stretching ratio of, for example, 3 to 4. This stretched PET film shows a high corrosion resistance against chemicals and is superior in heat resistance and moisture resistance, but optical anisotropy is formed in the film by the action of stretching, causing birefringence. Therefore, when an object is seen through a polarizing plate protected by such a PET film, colored fringes due to the interference of light are sometimes formed on the surface of the PET protective layer. Thus, this type of PET film is not suitable for use as a protective layer for a polarizing plate as used in a display in which a liquid crystal is used.

SUMMARY OF THE INVENTION

An object of the present invention is to provide a polarizing plate protected by a polyester film, such as a PET film, which is free from the abovedescribed problems and, in particular, which does not form colored fringes.

Other objects of this invention will be apparent to the skilled artisan from the detailed description of the invention, hereinafter.

It has now been found that a polarizing plate protected by a transparent protective layer which prevents formation of colored interference fringes due to reflected light or transmitted light can be provided by bonding a polyester film to at least one surface of a polarizing film through an adhesive layer. The film has its minimum or maximum refractive index in a direction parallel to the plane of the film nearly equal to the refractive index in the direction of the film thickness and the relative optical path length difference of the film at least 10 μm.

Therefore, an embodiment of the present invention relates to a polarizing plate comprising a polarizing film and a protective layer bonded through an adhesive layer to at least one surface of the polarizing film, wherein the protective layer is a polyester film in which the minimum or maximum refractive index in a direction parallel to the plane of the film is nearly equal to the refractive index in the direction of the film thickness and the relative optical path length difference is at least 10 μm.

Figure 1:
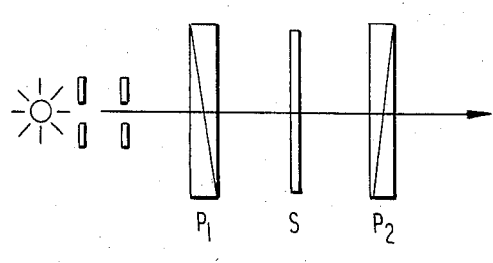
FIG. 1 is a schematic diagram of a crossed Nicol optical system.

The reference numerals 1, 2 and 3 indicate the following:

1, 3: Protective layer
2: Polarizing film

DETAILED DESCRIPTION OF THE INVENTION

The theory on which the present invention is based will hereinafter be explained.

Referring to FIG. 1, there is shown a crossed Nicol optical system comprising two polarizers $P_1$ and $P_2$ arranged so that their axes cross orthogonally. When a sample S of birefringent material is placed between the polarizers $P_1$ and $P_2$, the intensity I of light transmitted by the optical system can be represented by the equation (1), a standard equation in polarization optics. The sample S is biaxial, as will be explained below. In this equation the angle between the optic axis of either one of the polarizers $P_1$ or $P_2$ and the optic axis of the sample S is given as $\phi$. In fact, $\phi$ is measured relative to the polarizer $P_1$.

$$I = A \sin^2 2\phi \cdot \sin^2(\delta/2) \tag{1}$$

wherein A is a constant, and $\delta$ is a phase factor given by $\delta = (2\pi \Delta n \cdot d / \lambda)$, and where $\Delta n$ represents the maximum difference in the main refractive index in the plane parallel to the surface of the sample, $\lambda$ represents the wavelength of light, and d represents the thickness of the sample. Thus, the equation (1) can be represented by:

$$I = A \sin^2 2\phi \cdot \sin^2(\pi \cdot \Delta n \cdot d / \lambda) \tag{2}$$

$\Delta n \cdot d$ is called the relative optical path length difference.

As can be seen from the equation (2), when $\phi = 0$, $\pi/2$, $\pi$, $3\pi/2$, ..., light is not transmitted. However, even if $0 < \phi < \pi/2$, with $\phi$ held constant, when $\Delta n \cdot d / \lambda$ is equal to values between N and $(n+\frac{1}{2})$, with N as an integer, the luminous intensity varies according to $\sin^2(\pi \cdot \Delta n \cdot d / \lambda)$ from 0 to its maximum value. Actually, however, for larger values of N, the contrast produced by the change in $\Delta n \cdot d / \lambda$ is rapidly weakened, and thus, light of wavelength satisfying the foregoing conditions does not significantly induce the formation of colored fringes.

Accordingly, if N=1, and d=100 μm, a typical thickness value, and λ=550 nm, a wavelength of the central region of visible light, $\Delta n$ is calculated to be about 0.005. This value is smaller by more than one order of magnitude than 0.08–0.14, values of $\Delta n$ for a PET film. Hence, the value of N at which the PET satisfies $\Delta n \cdot d/\lambda = N$ or $(N+\frac{1}{2})$, is 10 or more. As far as the direction perpendicular to the plane of the film is concerned, no problems occurs in connection with the formation of colored fringes. That is, if the relative optical path length difference, $\Delta n \cdot d$, is in the vicinity of 10 $\mu$m, as far as the perpendicular direction is concerned, no problem occurs in connection with the formation of colored fringes because of the large values of N and the associated blurring of fringes. In the case of the foregoing PET film, the relative optical path length difference is 8 to 14 $\mu$m. Thus no perpenedicular direction fringes occur.

In the oblique direction, however, there may be a possibility of $\Delta n$ being near 0.005. Thus, when seen from that direction, colored interference fringes appear on the film because of the low value of N. This will be considered below.

Figure 2:
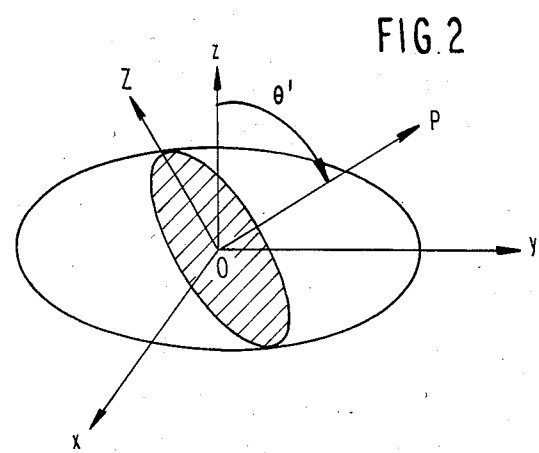
FIG. 2 is a view showing an index ellipsoid.

FIG. 2 is a view of an index ellipsoid represented by the equation (3):

$$(x^2/n_x^2)+(y^2/n_y^2)+(z^2/n_z^2)=1 \qquad (3)$$

wherein $n_x$, $n_y$ and $n_z$ are each a main refractive index. When the cross section of the ellipsoid including the origin is a circle, if the film is seen from a direction near, but not exactly on the normal line of the cross section, $\Delta n$ is very small (when seen from the direction of the normal line, $\Delta n = 0$). In more detail, when the film is seen from the direction at which $\Delta n = 0.005$, colored interference fringes are observed. Two cross sections are circular in shape for the index ellipsoid of FIG. 2 and are located symmetrically about the z axis. The symmetry arises from the symmetry of Equation (3) and the relative values of the main indices. Conditions under which the cross section is circular can be determined as follows:

The cross section (generally, oval) resulting from the cutting of an ellipsoid by a plane including the origin and having a normal line OP with an angle of $\theta'$ relative to the z axis is represented by the equation (4):

$$(x^2/n_x^2)+Z^2(\cos^2\theta'/n_y^2)+(\sin^2\theta'/n_z^2)=1 \qquad (4)$$

wherein x and y represent plane rectangular coordinates on the foregoing cross section when the direction of the normal line, $\overline{OP}$, of the cross section is chosen as the y axis of the x-y-z coordinates of FIG. 2 and the Z-axis is orthogonal to both the x-axis and the y-axis. Light travels along the OP axis. Equation (4) is obtained by determining the intersection of the index ellipsoid of Equation (3) with a plane normal to $\overline{OP}$ and including the x-axis and then transforming the x-y-z coordinates to the x-Y-z coordinates of FIG. 2. The condition required for the equation (4) to represent a circle is that the coefficient of $x^2$ is equal to that of $Z^2$; that is, the following equation is satisfied:

$$(1/n_x^2)=(\cos^2\theta'/n_y^2)+(\sin^2\theta'/n_z^2) \qquad (5)$$

From the equation (5), the following equation (6) can be obtained by algebraic and trigonometric operations.

$$\sin\theta'=[(1/n_y^2)-(1/n_x^2)/(1/n_y^2)-(1/n_z^2)]^{\frac{1}{2}} \qquad (6)$$

Figure 3:
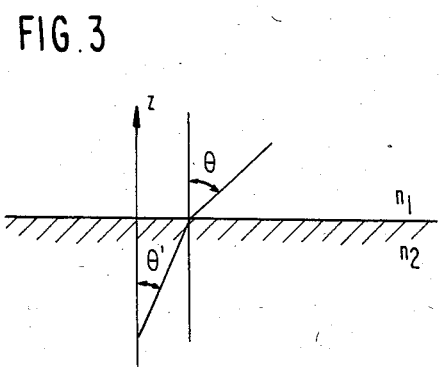
FIG. 3 is a view illustrating the refraction of light in the contact surface between a PET film and air.

When seen from a direction near the direction of the extreme angle $\theta$ related by Snell's law to the internal angle $\theta'$ satisfying the equation (6), colored interference fringes are observed since the cross section of the ellipsoid is nearly circular and $\Delta n$ is therefore small. However, the angle as determined herein is an angle within the medium of the film. For practical use, therefore, it is necessary to convert $\theta'$ into the angle 74 (see FIG. 3) when the film is observed through air, taking into account the refraction of light at the film surface. If the refractive index of air (considered to be 1) is indicated by $n_1$ and the average refractive index of the film, by $n_2$, the relation between $\theta$ and $\theta'$ can be represented by the equation (7):

$$n_1 \cdot \sin\theta = n_2 \cdot \sin\theta' \qquad (7)$$

Thus, if $\theta$ is near 90°, the formation of colored interference fringes is not observed even when the film surface is seen from an oblique direction. From the equations (6) and (7), the conditions under which $\theta > 90°$ (the condition of total internal reflection, for which no light is observable on the air side) with $n_1 = 1$ and $n_2 = 1.6$ (the average refractive index of the PET film) can be determined as follows:

$$\sin\theta' = [(1/n_y^2)-(1/n_x^2)/(1/n_y^2)-(1/n_z^2)]^{178} > 0.63 \qquad (8)$$

Equation (8) is obtained from Equations (6) and (7), using the indicated values of $n_1$ and $n_2$, and using the non-observable condition of $\theta > 90°$.

From the foregoing theoretical consideration, it can be determined that (1) if the relative optical path length difference is at least about 10 $\mu$m (preferably up to 200 $\mu$m), no colored interference fringes are observed on the surface of the PET film when it is seen from a direction perpendicular to the surface thereof, and (2) if the equation (8) is satisfied, (i.e., the difference between the minimum or maximum refractive index in the plane in parallel to the surface of the film and the refractive index in the direction of the film thickness is sufficiently small so as to fall within the range of $\pm 0.1$, no colored interference fringes are observed even when seen from an oblique direction. This result arises because for large values of relative optical path length difference, interference fringes occur only near the direction for which the cross-section of the index ellipsoid is circular (Equ. (6)). The condition that the interference fringes do not occur even in this direction is Equation (8). If the above requirements are satisfied, the interference fringes do not occur when viewed from any direction. The value of $\theta'$ was determined for two selected PET film samples and the results are shown in the table below.

| | nx | ny | nz | θ |
|---|---|---|---|---|
| Sample 1[*1] | 1.63 | 1.69 | 1.49 | 60° |
| Sample 2[*2] | 1.59 | 1.70 | 1.51 | >90° |

[*1]: Prepared by stretching in the direction of ny at a stretching ratio of 3.5 and in the direction of nx at a stretching ratio of 2 using a biaxial stretching machine.
[*2]: Prepared by stretching in the direction of ny at a stretching ratio of 3.5 using a monoaxial stretching machine.

In Sample 1, $\theta = 60°$ and, therefore, when film sample 1 is seen from a direction of external angle of about 60°, colored interference fringes are observed. On the other hand, in Sample 2, the calculated value of the external angle $\theta$ is more than 90° and, therefore, there is no direction in which colored interference fringes are observed when Sample 2 is seen from an oblique direction on the air side.

Examples of materials for use in the preparation of a polarizing film as used in the polarizing plate of the invention and a method of processing the materials; examples of the type of polyester film to be bonded as a protective layer onto the surface of the polarizing film, which does not form colored interference fringes, and a method of processing it; examples of the type of adhesive to be used for bonding the polarizing film to the protective layer; and so forth are described in detail below.

Various polarizing films can be used in the practice of the invention, including iodine/or dichroic dye-based polarizing films prepared by adsorbing polarizing elements such as iodine and/or dichroic dye onto hydrophilic polymer films such as polyvinyl alcohol-based films, partially formalized polyvinyl alcohol-based films, and ethylene-vinyl acetate copolymer saponified products (EVOH) and then elongating the films; polyene-based polarizing films prepared by dehydration treatment of polyvinyl alcohol-based films or dehydrochlorination treatment of polyvinyl chloride-based films to form polyenes and then elongating the films, etc.

Polyester films to be bonded through an adhesive layer to one or both surfaces of the polarizing film for the purpose of protecting the polarizing film include films of polyesters such as terephthalic acid type polyesters, isophthalic acid type polyesters or phthalic acid type polyesters. Specific examples include polyethylene isophthalate, polybutylene terephthalate, polyethylene terephthalate, polybutylene isophthalate and the like. By applying a stretching treatment in the uniaxial direction (longitudinal or transverse direction), corrosion resistance against chemicals is imparted to the polyester films.

The adhesive compositions used for bonding the polarizing film to the polyester film are required not only to have adhesion characteristics, but also to have optical transparency when formed in a layer of thickness of from about 2 to 50 $\mu$m and moreover not to remove or reduce the polarizing characteristics of the polarizing film by the action of any component contained therein. These materials are known in the art, and examples of suitable adhesives are polyester-based adhesives, polyacryl-based adhesives, epoxy-based adhesives, cyanoacrylate-based adhesives, polyurethane-based adhesives, and spiran-based adhesives.

When bonding together the polarizing film and the protective film, in order to obtain a sufficiently high adhesive strength, it is desirable that a surface treatment be applied to the surfaces at which the films are to be brought into contact.

Techniques which can be employed for the surface treatment of the polyester film include a sputtering method, an oxidation flaming method, a primer treating method, and an alkali treating method. On the other hand, for the surface treatment of the polarizing film, a primer treating method using a silane coupling agent, a polyisocyanate compound, etc., can be employed.

A silicone-based resin, for example, may be coated on the surface (exposed surface) of the polyester film to increase the scratch resistance of the film, or magnesium fluoride, for example, may be provided by vacuum deposition, for example, to increase the transparency of the film. These treatments lengthen the service life of the polarizing plate and are desirable in view of polarizing characteristics.

The present invention is illustrated in detail by reference to FIGS. 4 to 6 of the accompanying drawings.

Figure 4:
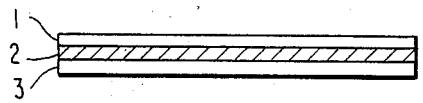
FIG. 4 is a cross-sectional view of an embodiment of the polarizing plate of the invention.
Figure 5:
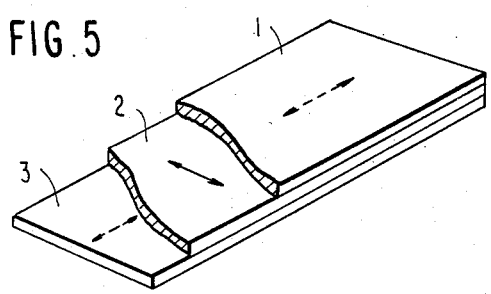
FIG. 5 is a partially cutaway perspective view of the polarizing plate of FIG. 4.

Referring to FIGS. 4 and 5, there is shown an embodiment of the polarizing plate of the invention. FIG. 4 is a cross sectional view of the polarizing plate, and FIG. 5 is a partially cutaway perspective view of the polarizing plate. A polarizing film 2 is produced by stretching a polyvinyl alcohol-based film with iodine adsorbed thereon to about 4 times the original length, thereby elongating the iodine molecules and providing the film with polarizing properties. Both surfaces of the film 2 are subjected to a surface treatment using a polyisocyanate compound. Protective films 1 and 3 are each a polyethylene terephthalate film which is stretched so that the thickness was 100 $\mu$m, the difference in main refractive index in the plane parallel to the surface is 0.11 (the minimum refractive index: 1.59 and the maximum refractive index: 1.70), and the main refractive index in the direction of thickness is 1.51, and are bonded by the use of a polyester-based adhesive to both surfaces of the polarizing film 2 in such a manner that the direction of stretching and the polarizing axis of the polarizing film 2 cross at right angle. The adhesive layer is not shown. An arrow of solid line indicates the polarizing axis of the polarizing film 2, and an arrow of dotted line indicates the direction in which the protective films 1 and 3 are stretched.

Figure 6:
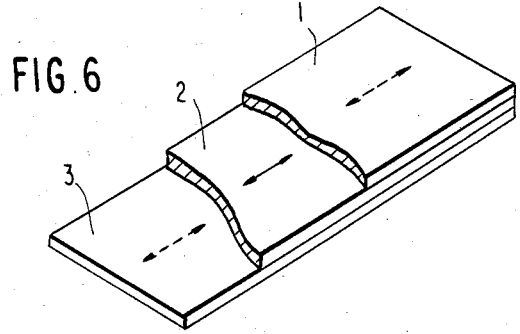
FIG. 6 is a partially cutaway perspective view of another embodiment of the polarizing plate of the invention.

FIG. 6 is a partially cutaway perspective view of another embodiment of the polarizing plate of the invention. In this embodiment, the same polarizing film, protective film, and adhesive as used in the foregoing embodiment are used, and the protective films are bonded to both surfaces of the polarizing film in such a manner that the polarizing axis of the polarizing film is in accord with the stretching direction of the protective film. The reference numerals in FIG. 6 indicate the same members as in FIG. 5. Also in FIG. 6, the arrow of solid line indicates the direction of the polarizing axis of the polarizing film 2, and the arrow of dotted line indicates the stretching direction of each of the protective films 1 and 3.

In both the embodiments, as expected from the above-described theoretical consideration, even if the polarizing plate is looked at from any direction under irradiation with white light, colored interference fringes are not observed. Also, when the polarizing plates are arranged as used in a liquid crystal display, i.e., the polarizing plates of the embodiments are placed in parallel with each other and are held so that the polarizing axes cross at right angles, colored interference fringes are not observed at all.

As apparent from the above explanation, the present invention provides a polarizing plate which when used singly or in combination with another polarizing plate in the arrangement that their optic axes cross at right angles, does not produce colored interference fringes.

While the invention has been described in detail and with reference to specific embodiments thereof, it will be apparent to one skilled in the art that various changes and modifications can be made therein without departing from the spirit and scope thereof.

What is claimed is:

1. A polarizing plate comprising a polarizing film and a protective layer bonded through an adhesive layer to at least one surface of the polarizing film, wherein the protective layer is a polyester film in which the minimum and maximum refractive indices, $n_x$ and $n_y$ respectively, in directions parallel to the plane of the film and the refractive index $n_z$ in the direction perpendicular to the plane of the film thickness satisfy the equation $$[(1/n_y^2)-(1/n_x^2)/(1/n_y^2)-(1/n_z^2)]^{\frac{1}{2}} > 1/n$$

and the relative optical path length difference is about or greater than 10 μm wherein $n_y$ is the one of said minimum and maximum indices closest in value to $n_z$ and n is the average refractive index of said polyester film.

2. A polarizing plate as claimed in claim 1, wherein the polyester film comprises a polyester selected from the group consisting of polyethylene terephthalate polybutylene terephthalate, polyethylene isophthalate, polybutylene isophthalate, and mixtures thereof.

3. A polarizing plate as claimed in claim 2, wherein the polyester film is longitudinally stretched.

4. A polarizing plate as claimed in claim 2, wherein the polarizing film is an iodine or dichroic dye-based polarizing film or a polyene-based polarizing film.

5. A polarizing plate as claimed in claim 2, wherein the difference between either the minimum or the maximum refractive index in a direction in parallel with the plane of the polyester film and the refractive index of the polyester film in the direction perpendicular to the plane of the film is about ±0.1.

6. A polarizing plate as claimed in claim 2, wherein the adhesive comprising the adhesive layer is at least one selected from the group consisting of a polyester-based adhesive, a polyacryl-based adhesive, an epoxy-based adhesive, a cyanoacrylate-based adhesive, a polyurethane-based adhesive, and a spiran-based adhesive.

7. A polarizing plate as claimed in claim 2, wherein the polyester film has been stretched and is bonded to the polarizing film so that the direction of stretching is normal to the polarizing axis of the polarizing film.

8. A polarizing plate as claimed in claim 2, wherein the polyester is polyethylene terephthalate.

9. A polarizing plate as claimed in claim 8, wherein the polyester film is longitudinally stretched.

10. A polarizing plate as claimed in claim 8, wherein the polarizing film is an iodine or dichroic dye-based polarizing film or a polyene-based polarizing film.

11. A polarizing plate as claimed in claim 8, wherein the difference between either the minimum or the maximum refractive index in a direction in parallel with the plane of the polyester film and the refractive index of the polyester film in the direction perpendicular to the plane of the film is about ±0.1.

12. A polarizing plate as claimed in claim 8, wherein the adhesive comprising the adhesive layer is at least one selected from the group consisting of a polyester-based adhesive, a polyacryl-based adhesive, an epoxy-based adhesive, a cyanoacrylate-based adhesive, a polyurethane-based adhesive, and a spiran-based adhesive.

13. A polarizing plate as claimed in claim 8, wherein the polyester film has been stretched and is bonded to the polarizing film so that the direction of stretching is normal to the polarizing axis of the polarizing film.

14. A polarizing plate as claimed in claim 2, wherein the polyester film has been stretched and is bonded to the polarizing film so that the direction of stretching is in the same direction as the polarizing axis of the polarizing film.

15. A polarizing plate as claimed in claim 8, wherein the polyester film has been stretched and is bonded to the polarizing film so that the direction of stretching is in the same direction as the polarizing axis of the polarizing film.

* * * * *